3,711,292
PREPARATION OF AN ALCOHOLIC BEER USING
A RAW CEREAL GRAIN HYDROLYSATE
Michael R. Sfat and Bruce J. Morton, Manitowoc, Wis., assignors to Bio-Technical Resources, Inc., Manitowoc, Wis.
No Drawing. Filed Apr. 23, 1970, Ser. No. 31,415
Int. Cl. C12c 5/00, 7/00; A23l 1/00
U.S. Cl. 99—31                                    7 Claims

ABSTRACT OF THE DISCLOSURE

A concentrated vegetable protein hydrolysate substantially free of starch is produced by treating a starchy proteinaceous cereal grain product in aqueous medium with added proteolytic enzyme in the absence of substantial added amylolytic enzyme to produce a solution containing soluble protein hydrolysis products together with a starchy carbohydrate fraction, separating the solution from undissolved residue, and treating the separated solution with added amylolytic enzyme to produce a substantially starch-free solution. The product is useful as a flavor precursor for a fermented alcoholic beverage, particularly beer, and as a food supplement or ingredient. The product may be incorporated in a fermentation wort for producing a fermented alcoholic beverage. A low carbohydrate beverage may be produced by incorporating a highly fermentable sugar in the wort to provide a wort low in unfermentable carbohydrates.

BACKGROUND OF THE INVENTION

This invention relates to a process for producing a concentrated vegetable protein hydrolysate substantially free of starch, to the product thereof, and to a process for producing a fermented alcoholic beverage, particularly beer, employing such product.

The brewing of beer classically is a process involving the alcoholic fermentation of an aqueous extract of germinated cereals, particularly barley, with the addition of hops. Barley grain gives a poor fermentable extract, and an unsatisfactory starch paste is obtained when it is mashed with hot liquor. The grain must, therefore, first be germinated to set free amylolytic enzymes which attack and hydrolyze the starch of the endosperm to soluble sugars at mashing. The germination is termed malting, and the germinated and kilned product is termed malt. The malt is ground and extracted with hot liquor to hydrolyze the dry matter to soluble sugars, producing an aqueous extract termed the wort. Part of the melt may be replaced by non-germinated cereals, especially rice and corn grits, technically known as raw grains, or sugars may be added to the wort. The wort is boiled with hops, cooled, and pitched with yeast for fermentation to beer.

The production of malt requires large production and storage facilities, and considerable time is required for the process of germinating the grain. It is apparent that plant capacity could be greatly reduced by reducing or eliminating the need for malt in brewing beer and like alcoholic beverages. Various efforts have been made in this direction, without great success. Beer is still produced for the most part by the classical methods involving the use of malt. While plant capacity has been reduced with increasing utilization of adjuncts in the wort, for supplying carbohydrates, extensive malting facilities continue to be required.

SUMMARY OF THE INVENTION

In the invention, a concentrated vegetable protein hydrolysate substantially free of starch is produced by a process which includes treating a starchy proteinaceous cereal grain product in aqueous medium with added proteolytic enzyme in the absence of substantial added amylolytic enzyme to produce a solution containing soluble protein hydrolysis products together with a starchy carbohydrate fraction, separating the solution from undissolved residue, and treating the separated solution with added amylolytic enzyme to produce a substantially starch-free solution.

The concentrated protein hydrolysate product of the foregoing process is especially valuable as a flavor precursor for a fermented alcoholic beverage, particularly beer. Inasmuch as the product is free of starch, it furnishes a very desirable fermentable extract, without the unsatisfactory starch paste obtained in mashing with hot liquor in the earlier attempts to employ a grain extract. The product may serve to eliminate malt from the brewing process, completely or partially as may be desired, with corresponding reduction in the requirements for malting capacity. The high protein, low carbohydrate content of the product also enables independent control of the protein and carbohydrate components of fermentation worts and the fermented beverages. The haze and flavor stability of the fermented beverages are from very good to excellent.

The concentrated protein hydrolysate product may be incorporated in a fermentation wort for producing a fermented alcoholic beverage, having any of various protein and carbohydrate levels. The low ratio of carbohydrate to protein in the product is especially advantageous for producing a low carbohydrate beverage. Such a beverage may be produced by incorporating a highly fermentable sugar in the wort, to provide a wort low in unfermentable carbohydrates. The fermentation product then has a low carbohydrate to protein ratio.

A low carbohydrate beverage as contemplated by the invention will have a carbohydrate to protein weight ratio below about 5½ to 1. Preferably, the ratio is maintained below about 4 to 1, and can be reduced to as low as about 3 to 1. In comparison, the carbohydrate to protein weight ratio in standard U.S. beers generally is about 11 to 1 at the present time.

The concentrated protein hydrolysate product is useful additionally as a high protein, low carbohydrate food supplement or ingredient. A desirable malt-like flavor and aroma may be developed in the product by further treatment, which is advantageous both when the product is used in brewing and when it is employed as a foodstuff. Thus, the product may be subjected to a heating or toasting process for enhancing its organoleptic properties, as described and claimed in our copending application Ser. No. 34,883 filed May 5, 1970. The toasted product makes an excellent replacement for malt in making malted milk and other nonalcoholic drink beverages, and various additional flavors may be superimposed on the basic malt-like flavor.

The solution of the concentrated protein hydrolysate, as produced initially, is especially advantageous in that it may be concentrated without gelling to a solids content of at least about 40% by weight, at which concentration it is well adapted for use in the heating process. The product solution may be concentrated further to a solids content of at least about 55% by weight. At such concentration, the solution is biologically stable at 0° C., and may be transported and stored without biological activity, particularly, mold formation. Consequently, the concentrate may be shipped in commerce and need not be manufactured at the place of use.

DESCRIPTION OF THE PREFERRED EMBODIMENTS

In the invention, a starchy proteinaceous cereal grain product is treated or extracted in aqueous medium with added proteolytic enzyme in the absence of substantial added amylolytic enzyme. The preferred grains are barley, wheat, oats and rye. For availability and production reasons, it is preferred to employ the whole grain. While either a hulled or dehulled grain may be employed, it has been noted in the case of barley that a beer of improved graininess is produced from the grain having the hull intact. Proteinaceous grain fractions may be employed, such as are obtained as by-products in milling operations. For example, barley pearlings are high protein by-product fractions which have been found to be good sources of protein concentrate according to the invention. The pearlings consist primarily of the aleurone fraction of barley. The material is, however, available in but limited amounts. High protein wheat flour is another example of a good source of protein concentrate.

The grain product preferably is finely divided or ground for use in the treatment process. Thus, a fine grind is preferred, rather than a coarse grind, as those terms are employed in the brewing industry. More particularly, it is preferred that at least about 99% of the finely divided material have a particle size below about 1 millimeter, i.e., passing through a U.S. Sieve Series No. 18 sieve, having a sieve opening of 1 millimeter. A fine grind provides the greater extractability of protein, e.g., as much as twice as great as with a coarse grind.

The grain product is mixed with water, and a proteolytic enzyme is added to the mixture for hydrolysis and solubilization of the grain protein. It was found that when more than an appreciable amount of amylolytic enzyme was added to the mixture, the protein content of the product decreased and the carbohydrate content increased markedly. In the preferred practice of the invention, the product solids contain at least about 40% protein by weight of the solids, thereby providing the desired concentration for independent control of the protein and carbohydrate components of the fermentation wort in beer making, and also providing low carbohydrate product for other purposes.

The proteolytic enzyme preferably is employed as an isolate or concentrate from natural sources, and may actually constitute a mixture of proteolytic enzymes. Numerous products are available, and, depending upon their source, they may include amylolytic enzyme. The products employed in the present invention have from low amylolytic enzyme content to no amylolytic enzyme content. They are also referred to in the trade as having relatively low diastatic activity. Such products may have less than about 1,000 starch liquefying units and less than about 200 starch dextrinization units (SKB), per gram. (An enzyme with 1,000 starch liquefying units per gram will reduce the viscosity of 300 times its weight of potato starch by 90% in ten minutes at 70° C. and pH 6.7. The starch dextrinization units represents the number of grams of beta-amylase treated soluble starch dextrinized by 1 gram of enzyme in one hour at 30° C. and pH 4.85.)

The preferred proteolytic enzymes are substantially pure isolates, i.e., substantially free of amylolytic enzyme, and include papain, bromelain, and ficin. Commercial papain is a mixture of at least two types of proteolytic enzymes derived from papaya, and it is activated by reducing agents such as bisulfites. Bromelain is a mixture of proteolytic enzymes derived from the pineapple plant. Ficin is a mixture of proteolytic enzymes obtained from the latex of the fig tree, and it is activated by reducing agents including bisulfite. The enzyme products are free of amylolytic activity. Concentrated protein hydrolysate products containing as much as 62% or more protein may be produced from whole grains employing such enzymes.

Proteolytic enzyme isolates having high proteolytic activity and low amylolytic activity also may be employed, but generally yield products having lower concentrations of protein, near the desired lower limit of 40% protein. For example, Rhozyme P–11 and Rhozyme 41 (Rohm and Haas) may be employed to produce products from barley containing up to about 45% of protein. Various other proteolytic enzymes may be employed as well.

A catalytic amount of a proteolytic enzyme is reacted with the grain product at a pH preferably in the optimum range for the enzyme. It has been found that, in general, an amount of the enzyme in the range of about 0.1–1% (pure proteolytic enzyme basis) by weight of the protein content of the grain product will produce the desired protein hydrolysis. Optimum activity of the enzyme generally will be exhibited in a pH range of about 4 to 9, more specifically, about 5 to 8. Thus, papain is employed herein at a preferred pH of about 6.5–7. Ficin is employed at a preferred pH of about 5.5 to 7.5. Bromelain is employed at a preferred pH of about 5.5–7.0. Rhozyme P–11 and Rhozyme 41 are employed at a pH in the range of about 6 to 9.

The proteolytic enzyme treatment preferably is conducted at a temperature of about 35–50° C., for generally optimum hydrolysis of protein and minimum extraction of carbohydrate. The treatment is continued for about one-half to six hours, varying inversely with the temperature. The lower temperatures may require a greater treatment time, and for that reason, are less desirable.

As noted above, the proteolytic enzyme treatment preferably is conducted in the foregoing manner so as to obtain an hydrolysate or extract solution containing at least about 40% protein by weight of the solids content thereof. This condition is achieved by appropriate selection of the grain or grain fraction, proteolytic enzyme and amount, absence of amylolytic enzyme, pH adjustment for the proteolytic enzyme, and treatment temperature and time. The yield of protein from the cereal grains, in general, ranges upwards from 60% by weight of the total grain protein under prefered conditions, the yield varying with the proteolytic enzyme employed for hydrolysis. The yield from barely whole grain is about 65% to 97%. (Protein values referred to herein are calculated as $6.25 \times$ Kjeldahl nitrogen.)

The proteolytic enzyme treatment of the aqueous dispersion of the grain product hydrolyzes the grain protein to soluble hydrolysis products, and also results in the extraction of a starchy carbohydrate fraction from the grain product. The starch present would interfere with brewing a satisfactory alcoholic beverage, and it causes the formation of a viscous gel if the solution is concentrated beyond about 33% solids.

The starch content of the solution resulting from proteolytic enzyme treatment is hydrolyzed by treating the solution with added amylolytic enzyme. It has been found that treatment of such solution in the presence of the undissolved residue results in further extraction of carbohydrate, reducing the protein concentration. Proceeding in accordance with the invention, separation of the solution from undissolved residue followed by amylolytic enzyme addition and treatment of the separated solution avoids additional carbohydrate extraction and provides for rapid and complete or substantially complete hydrolysis of starch, as determined by the starch-iodine test. The resulting solution or the solids content thereof then may be employed for brewing, and it may be concentrated to a solids content of at least about 40% by weight for brewing or other purposes, and to at least about 55% by weight for biological stability.

The amylolytic enzyme may be supplied by any of numerous enzyme-containing materials, including natural sources and isolates or concentrates therefrom. The presence of other enzymes is, in general, not a significant factor. Thus, enzyme products containing substantial proteolytic enzyme activity in addition to amylolytic activity may be employed, and the proteolytic enzymes may serve to provide additional hydrolysis of the soluble protein hydrolysis products of the proteolytic enzyme treatment. However, the presence of a proteolytic enzyme is optional.

The starch-containing solution may be treated with amylolytic enzyme which is naturally occurring or developed, as in malted grain. For example, a small amount of a distillers malt high in amylolytic activity may be employed, such malt being produced as described in U.S. Pat. No. 3,116,221 to Sfat et al. Such a treatment is advantageous when the product is intended for the production of beer, the flavor being improved as compared to other enzyme treatments.

Frequently, it will be preferable to employ an enzyme isolate or concentrate, which is commercially available, for simplicity and economy. Enzyme isolates which may be employed include, for example: HT Proteolytic (Miles Laboratories), produced by *B. subtilis*; Takamine Acid Fungal Protease (Miles Laboratories); and Rhozymes (Rohm and Haas), derived from *A. oryzae*, including Rhozyme J-25 and Rhozyme A-4. Another suitable product is Nervanase 10X (A.B.M. Industrial Products Ltd.), a bacterial alpha-amylase. Various other preparations containing amylolytic activity may be employed as well.

The amylolytic enzyme is added to the separated proteolytic enzyme hydrolysate solution in a catalytic amount. In general, an amount of the enzyme providing in the range of about 250–1000 DNS units per gram of the carbohydrate content of the hyrolysate solution will hydrolyze the starch content of the solution (DNS units are described in Example 1, hereinafter). It has not been found necessary to adjust the pH of the separated solution for amylolysis, although if desired, the pH may be adjusted to the optimum range for the particular amylolytic enzyme, generally in the pH range of about 4–8.

The amylolysis may be conducted at a temperature in a relatively wide range of about 35–75° C., so long as the enzyme is stable. Preferably, the temperature is about 45–65° C. The hydrolysis of starch is completed in about one-half to six hours, varying inversely with the temperature.

As noted above, the solution initially resulting from the foregoing proteolytic and amylolytic enzyme treatments is concentratable without gelling. The solution may be concentrated to a solids content of about 40% by weight or greater for use in a subsequent flavor and aroma enhancing treatment, and further to a solids content of at least about 55% by weight for biological stability. Such concentration may take place in a conventional evaporator operating under vacuum or subatmospheric pressure, at a temperature of about 35 to 55° C. The solution may be concentrated to a useful solid by spray drying.

The initial product solution may be employed directly or after concentration in a fermentation wort for the production of a fermented alcoholic beverage, particularly a beer. The solids content of the product solution serves as a protein source, and supplies the protein requirements for the beverage. The carbohydrate content of the fermentation wort, in addition to the relatively low amount of carbohydrate accompanying the protein in the product, may be supplied completely by conventional brewing adjuncts having varying concentrations of fermentable sugars, to provide an all-extract wort. Alternatively, the protein and carbohydrate contents of the wort may be supplied in part by malt, for improved flavor.

An especially advantageous embodiment of the invention embodies the use of adjunct consisting of a highly fermentable sugar, which together with the product solution or the solids content thereof, produces a low carbohydrate beer, as described above. The term "highly fermentable" refers to sugars capable of at least 90%, preferably at least 95% fermentation by brewers yeast and conversion to alcohol. Glucose (dextrose) is substantially completely fermentable and readily available, and therefore is the preferred sugar. It is contemplated that another mono- or disaccharide having the requisite fermentability, e.g., sucrose, alone or in admixture with another sugar, might be employed.

The product solution may be incorporated in a fermentation wort with a highly fermentable sugar to produce a beer having a carbohydrate caloric content, i.e., exclusive of alcohol and protein, of less than about 1.6 calories per ounce, more preferably less than about 1.1 calories per ounce, as calculated on the basis of 1.19 calories per ounce for each 1% of real extract carbohydrate. Such caloric content is highly desirable to the ultimate consumer and, in general, may provide as much as ⅓ less total calories than regular beers having the same alcohol and protein content.

In practice, the quantity of the product solution or a concentrate thereof needed for producing a beer of a given protein content is determined. Beer protein may range from about 0.15 to 0.4% by weight, with about 0.25 to 0.3% generally preferred. To that quantity of the product is added adjunct in a quantity sufficient, together with the fermentable portions of the product carbohydrate, to provide a wort which will yield the desired alcohol content in the beer. The alcoholic content of U.S. beer will fall in the range of about 2.8–4% by weight and may increase to 5% in malt liquor and ale. When beer is made employing both the product and malt, the product is added to a wort prepared from the malt in a conventional manner, following separation of the wort from spent grains. Adjunct is added to the resulting wort in a quantity sufficient to produce beer of the desired alcohol content.

After suitable dilution with brewing water, the wort is boiled with the addition of hops, and strained, cooled, and again adjusted with brewing water, all in a conventional manner to provide a wort ready for fermentation. Thus, for example, the wort is brought to a boil and boiled for about 1½ to 2 hours during which hops are added at the normal rate, the hops are strained out, the wort is cooled to about 20° C. and diluted with brewing water to the desired concentration, and the wort is finally cooled to about 8–14° C. The wort then is ready for fermentation with brewers yeast.

The wort prepared according to the invention is fermented in a conventional manner: The wort is pitched with brewers yeast and fermented for about 5–14 days at a temperature of about 8–14° C. The beer product is finished in a conventional manner, as by transferring it to storage tanks for up to about 2 months, filtering, chill-proofing, carbonating, bottling and pasteurizing.

Inasmuch as the new process employs no enzyme which will survive pasteurization, it is free of enzymes which can impair the flavor of the beer. The beer has from very good to excellent haze and flavor stability. The invention is especially significant for fermentation by a bottom fermentation process, which is illustrated herein. The invention is also applicable to fermentation by top fermentation processes, wherein the product protein concentrate may be employed to supply the protein requirements together with carbohydrate low in unfermentable materials.

The beers produced employing the concentrated protein hydrolysate product of the present invention as the only protein source have, in general, winey characteristics in various degrees. While the beers are palatable beverages which will be acceptable to many persons, they are less desirable for the general market in this respect than standard beers. Such characteristics are, however, not noticeable where malt is employed therewith, e.g., on a half and half basis as regards the protein content. The winey characteristics also are less noticeable where the real extract of the beer corresponds to a standard beer, rather than the low value of a low carbohydrate beer. Certain of the beers, particularly the low carbohydrate beers, may be lacking in the taste characteristic of fullness. Also, the caramel aroma of a standard beer is lacking, but this may be supplied by addition of caramel.

These flavor and aroma characteristics of the beer may be improved, to produce beers equivalent to standard beers, by treating the concentrated protein product so as to enhance its organoleptic properties, as claimed in our above-identified patent application Ser. No. 34,883. The treatment eliminates or minimizes the winey characteristics, produces taste fullness, and supplies the distinctive caramel aroma of standard beer. The treated product is especially significant for producing low carbohydrate beers, which prior to the present invention were lacking in flavor and fullness, and also may suffer from flavor instability.

Briefly, the treatment of our co-pending application comprises a heating or toasting process, wherein a moist intimate mixture of the protein hydrolysate of the present invention and a sugar is lightly toasted until a caramel flavor is imparted. In a preferred process, the above-described protein hydrolysate solution containing 40% or more solids is mixed with a granular sugar to provide a moist granular mixture for the heat treatment. Employing a highly fermentable sugar in the mixture, the toasted product may be employed for the production of either a standard beer or a low carbohydrate beer, as desired. Beer is produced with the toasted product in the same manner as described above for the protein hydrolysate of the present invention. In a desirable alternative, beer of comparable quality is produced employing a blend of the toasted product and the untoasted product of the present invention.

The toasted product also furnishes a valuable foodstuff flavor and protein source, being especially useful for making non-alcoholic beverages. A malt-flavored beverage may be prepared from a product toasted to a slightly greater degree than ordinarily preferred for the manufacture of beer. The toasted product when used for making malted milk furnishes a product of superior flavor, including better aftertaste characteristics and less grainy quality, as compared to conventional malted milk products. Malt-flavored soft drinks may be prepared, with additional flavors superimposed thereon if desired, which are very appetizing and have none of the characteristic "wet wool" aroma associated with this type of product when prepared from a malt base.

The following examples illustrate various embodiments of the invention, including the process for producing a concentrated protein hydrolysate, the product thereof, and the process for producing a fermented alcoholic beverage. The examples also illustrate the production of an organoleptically enhanced concentrated protein hydrolysate and the production of beer and other food products therefrom, as claimed in our aforesaid co-pending application. It will be understood that the invention is not limited to the examples or to the materials, conditions, proportions and procedures set forth therein, which are merely illustrative. In the examples, all proportions are by weight.

Example 1

A 2,000 gram quantity of hull-containing barley whole grain containing about 13.5% protein is ground at the No. 1 setting on a Labconco Laboratory Mill, providing a particle size distribution, percent retained on the U.S. Sieve Series sieve number indicated: No. 18, 0.2%; No. 30, 16.7%; No. 60, 59%; No. 100, 18.5%; through No. 100, 5.6%.

The ground grain is added to 10 liters of water, made up of 9 liters of tap water and one liter of brewing water containing 240 p.p.m. calcium sulfate, 100 p.p.m. sodium chloride, and 55 p.p.m. magnesium sulfate. After mixing, the pH is adjusted to about 6.6–6.7 by the addition of about 15 ml. of 15% sodium hydroxide.

As a source of proteolytic enzyme, 4 grams of standardized papain (S. B. Penick & Co., having 0.2 Penick milk clot units per gram) is added to the mixture, with 5 grams of potassium metabisulfite enzyme activator, and the mixture is maintained at 45° C. with stirring for 4 hours. The mixture is stored overnight at 0° C. and decanted.

The clear decanted solution is treated with a source of amylolytic enzyme, either Takamine acid fungal protease or HT Proteolytic enzyme. The materials employed herein had the following enzyme activities:

| | Amylolytic activity, DNS units/gm. | Proteolytic activity, colorimetric Northrop units/gm. |
|---|---|---|
| Takamine acid fungal protease | 42,000 | 31,000 |
| HT Proteolytic enzyme | 97,000 | 1,000 |

DNS units are determined according to the colorimetric method described in "Methods in Enzymology," vol. 1, p. 149 (1955, Academic Press, Inc., N.Y.). The conversion of starch to maltose is measured colorimetrically, employing dinitrosalicylic acid as the coloring agent. A 10 mg. sample of soluble starch is converted to 0.4 mg. of maltose hydrate in 5 minutes at 37° C. for each unit of activity. Colorimetric Northrop units are determined according to assay No. 10–313 of Marschall Division, Miles Laboratories.

The enzyme source is added in a quantity of 0.2 gram per liter, and the solution is maintained at 45° C. with stirring for 2 hours. The resulting solution is starch-free by the starch-iodine test. It contains about 4.4 to 4.8% solids including about 2.2 to 2.4% protein. The protein recovery from the grain is about 75 to 85%.

Solutions produced in the foregoing manner were concentrated in a circulating evaporator at temperatures in the range of 35–55° C. and under a vacuum of 27 inches of mercury (3 inches pressure) to solids concentrations in the range of 50–55% by weight, and concentrations up to about 65% could be obtained if desired. The protein content of the solids in such solutions was about 45–50% by weight of the solids. The solutions containing 55% solids when stored at 0° C. for 6 months exhibited no mold growth, whereas mold growth occurred below about 50% solids.

In place of the papain and potassium metabisulfite, the following proteolytic enzymes may be employed: Rhozyme 41, 8 grams; Rhozyme P–11, 8 grams; ficin (Miles Laboratories), 4 grams, and Collupulin (Wallerstein Co.), 4 grams. Rhozyme 41, derived from *A. oryzae*, typically contains about 50,000 hemoglobin units (HU) and 7500 casein solubilization units, together with about 75 starch liquefying units and about 30 starch dextrinization units, per gram. Rhozyme P–11 contains about 40,000 hemoglobin units and 10,000 casein solubilization units, together with about 850 starch liquefying units and about 150 starch dextrinization units, per gram. (An enzyme has an activity of 1,000 hemoglobin units per gram when 11.18 mg. of the enzyme produces an increase in soluble nitrogen of 5.00 mg. from 0.417 gm. of hemoglobin in 5 hours at 40° C. and pH about 8.0. An enzyme with an activity of 1,000 casein solubilization units per gram will solubilize nine times its weight of casein in one hour at 40° C.) Ficin (Miles) contains 1200 colorimetric Northrop units per gram.

In place of the acid fungal protease or HT Proteolytic enzyme, 0.2–0.3 gram per liter of the following enzymes or enzyme mixtures having amylolytic activity may be employed: Rhozyme J–25, Rhozyme A–4, and Nervanase 10X. Rhozyme J–25 typically contains about 17,600 starch liquefying units, 8,000 starch dextrinization units, 37,000 hemoglobin units, and 2,250 casein solubilization units per gram. Rhozyme A–4 typically contains about 9,500 starch liquefying units, 3,500 starch dextrinization units, 50,000 hemoglobin units, and 2,000 casein solubilization units per gram. Nervanase 10X contains about 30,000 DNS units per gram.

Beers were made from protein hydrolysate solutions produced in the foregoing manner. Thus, fermentation worts for producing beers of generally standard carbohydrate and protein content were prepared by adding brewing water and various adjuncts. The adjuncts were sugar syrups produced by hydrolysis of corn starch after germ separation, as conventionally employed for brewing, and included Vel-Bru IX 43° Baumé Corn Adjunct (Penick & Ford Ltd., typically containing 68% fermentable extract, dry basis), Nu-Bru corn adjunct concentrate (Corn Products Sales Co., containing 70–73% fermentable extract, dry basis), and Rex 1641 Corn Syrup (Corn Products Sales Co., typically containing 71% dextrose and maltose, dry basis). The worts thus prepared were boiled for 2 hours, hopped, adjusted to about 12.3° Plato with brewing water, pitched with brewers yeast, and fermented at a temperature of about 12° C. for 7 days. Also, glucose was added to protein hydrolysate solutions for producing low carbohydrate beer, and the worts were processed in a similar manner. (Glucose as referred to in the examples herein is in the form of the monohydrate, about 91% anhydrous glucose.)

Acceptable beers having a slightly winey flavor were produced employing the adjunct materials. Employing glucose as the adjunct, low carbohydrate beers were produced which were also thin and generally tart. Flavor and color more characteristic of a malt beer could be imparted to the beers by the addition of commercial caramel to the wort prior to boiling, and a preferred rate is about 0.8 ml. (of 65% solids) per 5 liters of wort.

Example 2

A protein hydrolysate solution was produced from barley whole grain and concentrated in the manner of Example 1, except that malt having the analysis shown in Table I was employed as the source of amylolytic enzyme.

TABLE I

| | |
|---|---|
| Moisture, percent | 5.0 |
| Extract, fine, percent | 79.6 |
| Extract, coarse, percent | 77.3 |
| Fine-coarse difference, percent | 2.3 |
| Color, ° L. | 1.78 |
| Diastatic power, ° L. | 226 |
| Alpha amylase, DU | 84.6 |
| Total protein, percent | 12.96 |
| Soluble protein, percent | 8.18 |
| Soluble/total protein ratio | 63.1 |

The malt was added to the decanted solution from proteolytic enzyme treatment at a rate of 10% by weight of the solids content of the solution, stirred for one hour at 45° C., filtered, and concentrated. The concentrate contained 59.3% dissolved solids, and the protein content was 57% by weight of the solids content.

The amino acid composition of the protein hydrolysate product was determined and is shown in Table II. The composition is compared with the compositions of a normal boiled wort from barley malt, and a normal barley malt mash after a 50-minute protein rest, as reported by Robbins et al., A.S.B.C. Proceedings, 1963, pages 124–129. The hydrolysate product contained substantially greater amounts of glutamic acid and aspartic acid and substantially lower amounts of proline, methionine, and tryptophan than normal malt mash or wort.

TABLE II

| | Percentage distribution | | |
|---|---|---|---|
| Amino acid | Boiled wort | Mash, 50-min. protein rest | Barley hydrolysate product |
| Lysine | 5.6 | 4.6 | 5.0 |
| Histidine | 3.2 | 3.0 | 2.1 |
| Arginine | 7.9 | 6.3 | 5.9 |
| Aspartic | 5.2 | 4.9 | 11.1 |
| Threonine | 3.1 | 3.7 | 4.2 |
| Serine | 11.6 | 4.6 | 4.7 |
| Glutamic | 2.7 | 1.0 | 18.6 |
| Proline | 18.4 | 29.7 | 8.6 |
| Glycine | 2.0 | 2.4 | 5.6 |
| Alanine | 5.7 | 5.4 | 6.1 |
| Cystine | 0.1 | 0.5 | 2.3 |
| Valine | 6.2 | 6.9 | 5.4 |
| Methionine | 1.9 | 1.8 | 0.6 |
| Isoleucine | 3.2 | 3.9 | 3.6 |
| Leucine | 6.7 | 7.3 | 6.7 |
| Tyrosine | 4.9 | 5.3 | 3.7 |
| Phenylalanine | 5.9 | 6.4 | 3.6 |
| Tryptophan | 3.7 | 2.6 | 1.0 |
| Ammonia | 1.7 | 0.8 | 1.6 |

The protein hydrolysate product could be employed in a fermentation wort for brewing beer of either standard or low carbohydrate content, adding commercial liquid adjunct for producing the standard beer, or glucose or sucrose for producing the low carbohydrate beer.

Example 3

Larker B-grade barley containing 14.52% protein on a dry basis was ground in a Labconco Laboratory Mill at a No. 47 setting to crush the kernels and loosen the hulls. After the grinding, the barley was separated from the hulls using an air aspirator with three passes through the machine. This removed about 16% of the material as hulls and fines. The kernel portion remaining was then reground in the Labconco Mill at a setting of 1.0, resulting in the production of barley flour, of which more than 99.5% passed through a No. 10 U.S. Sieve Series screen.

Two batches of protein hydrolysate were made utilizing this material. Each batch was made as follows: To 5 liters of distilled water was added 1,000 grams, dry basis, of barley flour. After the mix was thoroughly blended, 2 grams of papain (described in Example 1) and 2 grams potassium metabisulfite were added, and the mixture was stirred at 40° C. for a period of 4 hours. The vessel then was placed in a cold room at 0° C. and allowed to remain overnight.

The supernatant liquid was filtered with the assistance of Celite analytical-grade filter aid, utilizing a suction filter. The settled material was resuspended with 2.5 liters of distilled water, allowed to settle, and the supernatant filtered and added to the prior filtrate.

All filtrates from both batches then were pooled and concentrated (as described in Example 1), at a temperature of 40° C. The concentrate began to gel, and the evaporator was stopped and the concentrate removed. At this point, the concentrate contained 23.5% solids, with a solution protein level of 10.5% (44.5% by weight of the solids).

The concentrate was diluted with distilled water to a solids content of 11%. Malt having the analysis shown in Table I was added to the resulting solution for amylolysis of the starch content, at the rate of 10% by weight of the solids content of the solution.

The mixture was stirred for one hour at 45° C., filtered, and concentrated in a circulating evaporator as described in Example 1. The solids content increased to 45.5% by weight, at which time concentration was discontinued due to low volume in the evaporator. The concentrate had good flow properties.

The protein hydrolysate concentrate thus prepared was combined with a concentrate similarly prepared, except that malt was employed for amylolysis at a rate of 5% by weight of solids. The concentrates were combined in a ratio of three parts of the former to one part of the latter, in parts by weight based on total solids. The combined concentrates were mixed with Nu-Bru corn adjunct concentrate having 71.4% fermentable extract (dry basis), in a weight ratio of 1 part concentrate solids to 8 parts Nu-Bru solids, and the mixture was employed in a wort for brewing beer as described in Example 1. Overall flavor of the beer was improved over comparable beers of Example 1, with more of a beery character and less of a winey note. The haze stability was excellent. Analyses of the wort and the beer are shown in Table III.

TABLE III

Wort:
  Color, ° L. (a.b.)[1] _____ 1.6
  pH (a.b.)[1] _____ 5.50
  Protein, percent _____ 0.58
Beer:
  Real extract, percent _____ 4.23
  Alcohol, percent _____ 4.14
  R.D.F., percent [2] _____ 65.3
  Color, ° L. _____ 0.9
  pH _____ 4.10
  Protein, percent _____ 0.34

[1] After boil.
[2] Real degree of fermentation.

Example 4

Barley whole grain was treated with papain proteolytic enzyme and thereafter with Takamine acid fungal protease amylolytic enzyme, and the resulting protein hydrolysate solution was concentrated to 55.7% solids, as described in Example 1. The protein content of the solids was 44.8%.

Beers were comparatively brewed by the procedure described below, employing a standard wort from barley malt and common yellow corn grits, and a wort one-half standard and one-half made up of the protein hydrolysate solution concentrate and liquid adjunct (Vel-Bru IX 43° Baumé Corn Adjunct) combined in the kettle. The malt employed for producing the standard wort had the analysis shown in Table IV.

TABLE IV

Moisture, percent _____ 3.7
Extract, fine, percent _____ 77.3
Extract, coarse, percent _____ 75.6
Fine-coarse difference, percent _____ 1.7
Color, ° L. _____ 1.70
Diastatic power, ° Lintner _____ 139
Alpha amylase, DU _____ 42
Total protein, percent _____ 13.00
Soluble protein, percent _____ 5.17
Soluble/total protein ratio _____ 39.8

In preparing the standard wort, a grain bill consisting of approximately 70% malt and 30% yellow corn grits (as is basis) was used. A two-roller Miag Laboratory mill was employed to grind the malt, and was adjusted so that 73 to 75% of the crushed malt remained on the No. 1 screen of the Pfungstadt series. Laboratory distilled water was made up to 240 p.p.m. calcium sulfate, 100 p.p.m. sodium chloride and 55 p.p.m. magnesium sulfate for the brewing process (including sparge water). The procedure was as follows:

A cereal mash was made up by adding 190.5 grams of corn grits (dry basis) and 50 grams of malt (dry basis) to 1,060 grams of 45° C. water, and was then agitated continuously with a turbine-type impeller. The temperature was maintained at 45° C. for 15 minutes and then raised to boiling within 35 minutes. After a 15-minute boil, the cereal mash was combined with a malt mash.

The malt mash was made up by adding 450 grams of malt (dry basis) to 1,340 grams of 38° C. water. This mixture was agitated for 10 minutes with a blade-type mixer and then allowed to rest for 60 minutes at 38° C. After combining the cereal and malt mashes, the temperature was increased to 73° C. conversion temperature within approximately five minutes, and was then held at 73° C. for 30 minutes. The temperature was raised to 75° C., and the mash was transferred to a lauter column.

Following a rest period of 15 minutes, run-off was initiated. The wort was run off until clear, and the first portion was recycled. Sparging was begun when the liquid level was one inch above the grain bed, and was adjusted to approximate the run-off rate. A temperature of 75° C. was maintained during the entire lautering period. Approximately 5,000 grams of wort, referred to as the standard wort, was collected in a two-gallon stainless steel container.

In producing a wort one-half standard and one-half protein hydrolysate and adjunct, one-half of a standard wort prepared in the foregoing manner was combined with 108 grams of the protein hydrolysate solution concentrate, 550 grams of the Vel-Bru adjunct, 16 drops of Sethness B & C #145 caramel coloring (about 65% solids), and brewing water to make 5 liters.

Each wort was then processed as follows: The wort was brought to boil, and hops were added at the rate of two grams at the start of boiling, two grams one hour after the start of boiling, and five grams twenty minutes before the kettle was knocked out at the completion of a two-hour boiling period. The wort then was strained to remove the hops, cooled to 20° C., and adjusted to 12.2–12.3 percent solids with brewing water.

The wort was aerated and pitched with washed, centrifuged brewers yeast at a rate of about 1 pound per barrel, and then placed in a closed glass column fermenter. The wort was fermented for about seven days at 12° C., until the apparent extract was within 0.3 degrees Plato of that determined by the A.S.B.C. rapid fermentation test. Following fermentation, the beer was held at 1° C. for 24 hours to inactivate and help settle the yeast from suspension. It was then transferred by means of carbon dioxide pressure to storage bottles and aged at 1° C. for three weeks.

After aging, the beer was filtered through a one-plate powder filter into a two-gallon stainless steel carbonation tank, where it was carbonated to 2.6 volumes. The beer was then bottled by means of a hand filler, using carbon dioxide counter pressure, pasteurized, cooled and stored at 1° C. Approximately 16 six-ounce bottles of beer were obtained from each brew.

The analytical and flavor properties of the two brews were quite similar, with the beer made from one-half standard wort and one-half protein hydrolysate and adjunct being slightly more winey. Analyses for the brews are shown in Table V:

TABLE V

|  | Standard brew | ½ standard plus ½ hydrolysate brew |
|---|---|---|
| Wort: |  |  |
| Color, ° L. (a.b.) | 3.3 | 2.6 |
| pH (a.b.) | 5.50 | 5.72 |
| Protein, percent | 0.49 | 0.52 |
| Beer: |  |  |
| Real extract, percent | 5.073 | 4.806 |
| Alcohol, percent | 3.74 | 3.77 |
| R.D.F., percent | 58.2 | 60.3 |
| Color, ° L. | 2.4 | 2.0 |
| pH | 4.35 | 4.20 |
| Protein, percent | 0.32 | 0.38 |
| Foam stability, sigma | 127 | 113 |

Example 5

A concentrated protein hydrolysate solution was produced from whole barley grain in the manner of Example 1, employing 70 pounds of ground barley grain. The ground grain was mixed with 40 gallons of tap water at 45° C., and the pH of the mixture was adjusted to about 6.7 with 15% sodium hydroxide.

70 grams of papain (described in Example 1) and 70 grams of potassium metabisulfite were added to the mixture, and the mixture was stirred at 45° C. for one hour. Approximately 10 gallons of cold tap water was added to the mixture, reducing its temperature to 25° C. The mixture was allowed to stand for two hours at 25° C., at which time the clear supernatant liquid was removed by siphoning.

The supernatant liquid was mixed with H.T. proteolytic enzyme (described in Example 1) at a rate of 0.2 gram per liter, and the mixture was stirred for two hours at 45° C. The resulting solution was concentrated at 50–55° C. under a vacuum of 27 inches of mercury, to produce a protein hydrolysate concentrate containing 53.5% solids. The protein content was 46.4% by weight of the solids.

A 400 gram portion of the hydrolysate concentrate was blended by hand with 1500 grams of finely granulated glucose, producing a granular mixture containing 16.8% water. The mixture was dried in a kiln with forced air at room temperature for about 15 minutes. The air then was heated to 82° C., and the bottom of the bed reached 82° C. in about 12 minutes. Circulation of air at 82° C. continued for an additional 30 minutes, during the last 20 minutes of which the bed temperature was 80° C. The mixture had a slight caramel aroma at this time, and the toasted material was removed from the kiln, spread on trays, and cooled by exposure to air at room temperature.

Low carbohydrate beers were produced from the toasted product. The beers had substantially greater beer-like quality than those from untoasted material, and there was no winey note. They were superior in flavor and aroma to prior commercial low carbohydrate beers. Two of the beers, identified as Nos. 1 and 2, were prepared as follows:

Beer No. 1 was prepared by dissolving 350 grams of toasted product in brewing water to make 5 liters. The resulting wort was then brought to boil and boiled for 2 hours with hop addition according to the standard schedule (as in Example 4), using a total of 7 grams of hops. After boiling, the hops were removed by straining, and the wort was cooled and adjusted to 8.3° Plato. The wort was fermented as described in Example 4.

Beer No. 2 was prepared by dissolving 330 grams of toasted product and 30 grams of a malt extract prepared from redried distillers-type malt, in brewing water to make 5 liters. Processing of the resulting wort and fermentation followed the same schedule as for beer No. 1.

The malt extract used in the preparation of beer No. 2 was prepared from a gibberellic acid-treated, distillers-type malt produced as described in U.S. Pat. No. 3,116,221. The malt was dried for an additional 3 hours at 82° C. to approximate the degree of kilning ordinarily accorded a brewers-type malt. Analysis of this malt revealed a moisture content of 2.4% and a soluble protein level of 7.07%. The malt was ground to a standard brewers grind, and extracted using the brewing procedure of Example 4, omitting the cereal mash. After wort run-off, the collected wort was evaporated to produce a concentrate containing 65.3% solids, of which 7.0% by weight of the solids was protein.

The analyses of the worts and beers, Nos. 1 and 2, are shown in Table VI.

A malt liquor type of beverage also was produced from the toasted mixture, as follows: 500 grams of the toasted product was dissolved in brewing water with 75 grams of Nu-Bru corn adjunct concentrate (81.4% solids containing 71.4% fermentable extract) to make 5 liters. The resulting wort was boiled for 2 hours with the addition of 12 grams of hops, followed by straining to remove the hops. The cooled wort was adjusted to 14.0° Plato with brewing water and fermented as described in Example 4. The analyses of the wort and beer are shown in Table VI, identified as No. 3.

TABLE VI

| Number | 1 | 2 | 3 |
|---|---|---|---|
| Wort: | | | |
| Color, ° L. (a.b.) | 4.4 | 4.4 | 9.4 |
| pH (a.b.) | 5.68 | 5.72 | 5.35 |
| Protein, percent | 0.48 | 0.50 | 0.72 |
| Beer: | | | |
| Real extract, percent | 1.227 | 1.306 | 4.177 |
| Alcohol, percent | 3.61 | 3.50 | 4.87 |
| R.D.F., percent | 85.5 | 84.3 | 70.2 |
| Color, ° L | 3.6 | 3.6 | 7.9 |
| pH | 4.20 | 4.12 | 4.40 |
| Protein, percent | 0.39 | 0.38 | 0.57 |
| Foam stability, sigma | 112 | 129 | 130 |

Example 6

A portion of the protein hydrolysate concentrate of Example 5 was spray dried in a Niro Laboratory drier. The inlet air temperature was 175° C., and the outlet or exhaust air temperature was 70° C. The product contained 10.3% moisture.

A wort for a low carbohydrate beer was prepared by dissolving 45 grams of the spray dried product (dry basis) and 273 grams of glucose in 5 liters of brewing water. The wort was boiled, hopped with 9 grams of hops, cooled, adjusted to 8.0° Plato with brewing water, and fermented with brewers yeast, in the manner of Example 4. The beer had a good aroma and a smooth, beery taste with a slight after-bitter. Analyses of the wort and beer product are shown in Table VII, identified as No. 1.

A toasted product was prepared from the spray dried product and employed for the production of a normal bodied beer. A 55 gram portion of the spray dried product was dry-mixed with 55 grams of glucose and then mixed well with 4 grams of distilled water. The mixture was placed in a kiln, and forced air at 38° C. was passed through the mixture, for 10 minutes. The air temperature then was raised to 82° C., and forced air at such temperature was passed through the mixture for 30 minutes. The toasted product was removed from the kiln and cooled in the atmosphere to room temperature.

The toasted product, 480 grams of Nu-Bru corn adjunct concentrate (81.4% solids containing 71.4% fermentable extract), and 50 grams of glucose were dissolved in brewing water to make 5 liters. The wort was boiled, hopped with 9 grams of hops, cooled, adjusted to 12.3° Plato, and fermented with brewers yeast, in the manner of Example 4.

The beer brewed from the toasted product had excellent flavor and aroma. The beer was very smooth and full bodied, comparable to a premium beer. Beer analytical characteristics were normal. Analyses of the wort and beer are shown in Table VII, identified as No. 2.

TABLE VII

| Number | 1 | 2 |
|---|---|---|
| Wort: | | |
| Color, ° L. (a.b.) | 3.0 | 3.0 |
| pH (a.b.) | 5.80 | 5.55 |
| Protein, percent | 0.41 | 0.40 |
| Beer: | | |
| Real extract, percent | 1.16 | 4.59 |
| Alcohol, percent | 3.47 | 3.65 |
| R.D.F., percent | 86.0 | 63.3 |
| Color, ° L | 2.0 | 2.0 |
| Protein, percent | 0.21 | 0.24 |
| Foam stability, sigma | 105 | 89 |
| pH | 4.07 | 3.83 |
| Total calories/12 oz.[1] | 102 | |
| Carbohydrate calories/oz.[2] | 1.03 | |

[1] Calculated using the formula: Calories/12 oz.=[(4×percent real extract)+(7×percent alcohol)]×specific gravity×3.548.
[2] Calculated based on 1.19 calories/oz./percent real extract carbohydrate.

Example 7

A protein hydrolysate concentrate containing 56.6% solids having a protein content of 49.7% was produced from barley whole grain in the manner of Example 5. The concentrate and a toasted product prepared therefrom were blended in fermentation worts and brewed for the production of low carbohydrate and normal bodied beers. In this instance, the toasted product was toasted to a greater extent than when intended for use as the sole protein source in a fermentation wort, in order to augment the organoleptic properties of the untreated concentrate portions of the worts.

The toasted product was made by blending 800 gm. of the concentrate with 3000 gm. of glucose, producing a moist granular mixture. The mixture was dried and toasted in a kiln with forced air at the following temperatures for the indicated periods of time: room temperature, 1 hr.; 38° C., 1 hr.; 49° C., 1 hr.; 65° C., 30 min.; and 82° C., 55 min. The mixture then was cooled in the kiln with air at room temperature.

A wort for a low carbohydrate beer (No. 1) was prepared from 125 gm. of toasted product, 35 gm. of protein hydrolysate concentrate, 225 gm. of glucose, and brewing water to make 5 liters. Boiling and hopping were conducted, the wort was adjusted to 8.3° Plato, and the wort was fermented, in the manner of Example 4. The beer stood overnight at 0° C. and then was filtered, carbonated, and bottled.

A wort for a normal bodied beer (No. 2) was prepared from 125 gm. of toasted product, 60 gm. of protein hydrolysate concentrate, 550 gm. of Nu-Bru corn adjunct concentrate (81.4% solids containing 71.4% fermentable extract), and brewing water to make 5 liters. The wort was processed as described above for beer No. 1, except that the wort was adjusted to 12.3° Plato for fermentation.

The flavor qualities of the beers were very good, and the analytical characteristics of both beers were normal. The analyses of the worts and beers are shown in Table VIII.

TABLE VIII

| Number | 1 | 2 |
|---|---|---|
| Wort: | | |
| Color, ° L. (a.b.) | 5.5 | 5.4 |
| pH (a.b.) | 5.25 | 5.30 |
| Protein, percent | 0.35 | 0.43 |
| Beer: | | |
| Real extract, percent | 1.13 | 4.79 |
| Alcohol, percent | 3.49 | 3.69 |
| R.D.F., percent | 86.3 | 60.7 |
| Color, ° L | 4.0 | 4.1 |
| Protein, percent | 0.24 | 0.29 |
| Foam stability, sigma | 91 | 102 |
| pH | 3.93 | 3.95 |

Example 8

A 2,000 gram quantity (dry basis) of northern-grown hard winter wheat was ground on a Labconco Mill at a setting of 1.5 (99.5% particles less than 1 mm. diameter). The product was mixed with 10 liters of water, including 9 liters of cold tap water and 1 liter of brewing water. The pH of the mixture was adjusted to 7 by the addition of 15 ml. of 15% sodium hydroxide.

To the mixture was added 5 grams of papain (as described in Example 1) and 6 grams of potassium metabisulfite, and the mixture was stirred for 4 hours at 45° C. To the mixture was added 5 liters of cold tap water, and the mixture was held at 0° C. overnight.

Approximately 9 liters of liquid extract then was removed by siphoning the supernatant liquid. The extract was treated with 0.2 gram per liter of HT Proteolytic enzyme (as described in Example 1) at 45° C. with stirring for 3 hours. The resulting hydrolysate solution contained 2.3% solids, including 1.38% protein. It had a pH of 4.3.

The hydrolysate solution was concentrated in a circulating evaporator, in the manner of Example 1. The concentrated solution contained 60.5% solids by weight, and the protein content was 61.6% by weight of the solids.

A 76 gram portion of the protein hydrolysate concentrate was blended by hand with 315 grams of finely granulated glucose, producing a moist granular mixture. The mixture was dried in a kiln with forced air at room temperature for 75 minutes, and then with air at 38° C., for 30 minutes. After breaking up agglomerates, air at 82° C. was passed through the mixture for 45 minutes. At this time, the toasted mixture had the desired very slight caramel taste, and was air cooled to room temperature.

Two additional portions of the protein hydrolysate concentrate were mixed with adjunct: a 76 gram portion was mixed with 315 grams of glucose; and a 65 gram portion was mixed with 585 grams of Nu-Bru corn adjunct concentrate (81.4% solids containing 71.4% fermentable extract).

Fermentation worts were prepared with the toasted mixture (No. 1), the comparable untoasted glucose mixture (No. 2), and the corn adjunct mixture (No. 3). Mixtures Nos. 1 and 2 served to provide low carbohydrate worts and beers, and mixture No. 3 served to provide a wort and beer of normal body. The worts were prepared and fermented as follows: Each system was diluted with brewing water to a total volume of 5 liters. The worts were then brought to boil, and boiling maintained for a total of 2 hours, during which hops were added at the normal rate, as described in Example 4. After boiling, the hops were removed by straining, and the two low carbohydrate worts (Nos. 1 and 2), were adjusted with brewing water to 8.0° Plato. The normal bodied wort (No. 3) was adjusted to 12.3° Plato. After adjustment, all samples were pitched with yeast at a rate of 1 lb./bbl., and placed in fermentation at 12° C. for 7 days. Following fermentation, the beers were stored at 0° C. for 24 hours and then filtered, carbonated and bottled for analysis.

The toasted mixture, No. 1 produced a good beer, having a well balanced flavor with a caramel aroma and taste, at least equivalent to commercial low carbohydrate beers. The comparison mixture, No. 2, produced a beer which, while an acceptable beverage, had a slightly sour aroma and was tart. The corn adjunct mixture, No. 3, produced an acceptable beer which also had a slightly sour aroma, was slightly winey, and was full tasting. The aroma and flavor of the latter two beers could be improved by the addition of caramel to provide a slight caramel note. The analyses of the several worts and beers are shown in Table IX.

TABLE IX

| Number | 1 | 2 | 3 |
|---|---|---|---|
| Wort: | | | |
| Color, ° L. (a.b.) | 10.2 | 1.9 | 3.3 |
| pH (a.b.) | 4.45 | 4.55 | 5.80 |
| Protein, percent | 0.52 | 0.60 | 0.48 |
| Beer: | | | |
| Real extract, percent | 1.42 | 1.14 | 4.36 |
| Alcohol, percent | 3.40 | 3.40 | 3.59 |
| R.D.F., percent | 82.6 | 85.6 | 63.7 |
| Color, ° L | 8.5 | 1.2 | 2.1 |
| Protein, percent | 0.50 | 0.45 | 0.34 |
| Foam stability, sigma | 136 | 121 | 125 |
| pH | 4.05 | 4.12 | 4.05 |
| Total calories/12 oz | 104 | 100 | 155 |
| Carbohydrate calories/oz | 1.09 | 0.82 | 4.8 |

Example 9

A 1000 gram portion of the protein hydrolysate concentrate of Example 7 was blended with 3150 grams of finely granulated glucose. The mixture was dried and toasted as described in Example 5, extending the heating period to 4 hours with air at 82° C. The somewhat chunky product was reduced to a powder in a blender. The toasted product generally was slightly darker, having more of a light tan color than the product normally preferred for brewing.

A malted milk beverage is prepared by blending the following mixture for about 30 seconds prior to pouring into glasses for consumption.

|  | G. |
|---|---|
| Toasted product | 50 |
| Milk | 350 |
| Vanilla ice cream | 300 |
| Chocolate syrup | 15 |

The beverage has better aftertaste characteristics and less of the grainy qualities normally associated with commercial malted milk products.

A malt-flavored soft drink is prepared by dissolving 300 grams of totasted product in 4 liters of distilled water and filtering through a Sparkler filter. The filtrate is carbonated for 1½ hours at 25 p.s.i.g., and then is bottled and pasteurized. The beverage has a definite malty quality to the flavor and aroma, with none of the "wet wool" type of aroma.

Other flavors are readily superimposed on the foregoing basic soft drink formula. The following compositions are used to make lime and chocolate flavored drinks, by the foregoing procedure:

| | | |
|---|---|---|
| Toasted product | g | 150 |
| Distilled water | l | 2 |
| Real-Lime reconstituted lime juice (food coloring to furnish yellow-green coloration) | g | 78 |
| Toasted product | g | 150 |
| Distilled water | l | 2 |
| Hershey's chocolate syrup | g | 175 |

The first composition provides a beverage having a distinct lime flavor with a malty background note. The second composition provides a chocolate and malt-flavored beverage.

We claim:

1. In a process for brewing an alcoholic beer, the improvement for independently controlling the protein and carbohydrate components of the beer which comprises
    treating a starchy proteinaceous raw cereal grain product in aqueous medium with added proteolytic enzyme in the absence of substantial added amylolytic enzyme at about 35–50° C. and for a time period of about ½–6 hours to produce a solution containing soluble protein hydrolysis products together with a starchy carbohydrate fraction, said solution containing at least about 40% protein by weight of the solids content thereof,
    separating said solution from undissolved grain product residue without further heating, thereby preventing further extraction of grain carbohydrate in said residue,
    treating the separated solution with added amylolytic enzyme at about 35–75° C. for a time period of about ½–6 hours to produce a concentrated protein hydrolysate substantially free of starch,
    adding to said starch-free hydrolysate a sugar fermentable to an extent and in a proportion selected to produce a brewers wort fermentable to a beer having an alcohol content in the range of about 2.8–5% by weight, a desired protein content in the range of about 0.15–0.4% by weight, and a desired carbohydrate content in the range of from a low carbohydrate caloric content of less than about 1.6 calories per ounce to the caloric content of a standard beer, and
    fermenting said brewers wort to produce a beer having said alcohol, protein and carbohydrate contents.

2. A process as defined in claim 1 wherein a highly fermentable sugar is added to said starch-free hydrolysate to produce a brewers wort fermentable in the absence of addition enzyme to a beer having said low carbohydrate caloric content.

3. A process as defined in claim 1 wherein said proteolytic enzyme treatment is conducted in a medium free of added amylolytic enzyme.

4. A process as defined in claim 1 wherein said separated solution is treated with an amylolytic enzyme isolate.

5. A process as defined in claim 1 wherein said grain product is selected from the group consisting of barley, wheat, oats, and rye products.

6. A process as defined in claim 1 wherein said grain product is barley whole grain.

7. A process as defined in claim 1 wherein said proteolytic enzyme treatment is conducted with an enzyme selected from the group consisting of papain, bromelain, and ficin in a medium free of added amylolytic enzyme.

References Cited

UNITED STATES PATENTS

| | | | |
|---|---|---|---|
| 3,157,513 | 11/1964 | Allen et al. | 99—17 |
| 3,212,902 | 10/1965 | Bavisotto | 99—5 X |
| 2,692,199 | 10/1954 | Weber | 99—42 |
| 3,295,987 | 1/1967 | Hoshino et al. | 99—29 X |
| 3,081,172 | 3/1963 | Dennis et al. | 99—50 X |
| 3,066,025 | 11/1962 | Simkin | 99—35 |
| 3,379,534 | 4/1968 | Gablinger | 99—31 |

JOSEPH M. GOLIAN, Primary Examiner

D. M. NAFF, Assistant Examiner

U.S. Cl. X.R.

99—17, 28, 29, 50, 52, 53, 140 R